United States Patent

[11] 3,595,997

[72] Inventor Lester Q. Krasin
Dallas, Tex.
[21] Appl. No 768,327
[22] Filed Oct. 17, 1968
[45] Patented July 27, 1971
[73] Assignee Seismograph Service Corporation
Tulsa, Okla.

[54] DATA READOUT SYSTEM
12 Claims, 8 Drawing Figs.

[52] U.S. Cl. .......... 178/23
[51] Int. Cl. .......... H04l 15/26
[50] Field of Search .......... 178/23, 26, 26.5, 3; 340/152, 154, 213, 150, 151, 164

[56] References Cited

UNITED STATES PATENTS

| | | | |
|---|---|---|---|
| 2,918,654 | 12/1959 | Hillyer | 340/150 |
| 3,096,138 | 7/1963 | Stark | 340/150 |
| 3,143,597 | 8/1964 | Hagstrom et al | 178/4.1 |
| 3,388,380 | 6/1968 | Coffin et al | 340/152 |
| 3,466,605 | 9/1969 | Schoenwitz | 340/151 |

*Primary Examiner*—William C. Cooper
*Assistant Examiner*—Jon Bradford Leaheey
*Attorneys*—Owen, Wickersham & Erickson and Everett G. Clements ABSTRACT: A system for printing out plain language words or word groups in response to a single data input signal comprises means for decoding and temporarily storing data input signals received from a remote transmission source, a printout means responsive to input impulses, time base means mechanically coupled to said printout means for providing sequential synchronizing outputs for each actuation of the printout means, and programmable converter means for combining the synchronizing outputs from the time base means with a data input signal for producing a sequence of coded pulses for actuating said printout means to print a predetermined combination of characters in accordance with the established converter programming.

INVENTOR.
LESTER Q. KRASIN
BY
Owen, Wickersham & Erickson
ATTORNEYS

INVENTOR
LESTER Q. KRASIN
BY
Owen, Wickersham & Erickson
ATTORNEYS

INVENTOR.
LESTER Q. KRASIN
BY
Owen, Wickersham & Erickson
ATTORNEYS

DATA READOUT SYSTEM

This invention relates to data readout systems and more particularly to a method and apparatus for converting data signals into printed plain language word groups on teleprinter equipment.

Data converted from coded signals and printed as familiar words or groups of words that can be easily understood are often more effective and desirable than coded messages or other data forms. This is particularly true in systems where decisions must be made by a human operator on the basis of data received from remote stations, as in the monitoring or controlling of fluid flow control apparatus. A general object of the present invention is to provide a data receiving apparatus that will printout plain language words or word groups using teleprinter equipment.

My invention is particularly adaptable to a remote alarm or status reporting system that can supply one or a series of single coded data transmissions which are adaptable to a readout comprising an entire message in the form of recognizable words and/or symbols. Such symbols, words and phrases which are necessary to form a specific data transmission may be arbitrarily assigned to values in a simple existing data transmission code system.

Conventional teleprinter equipment is one form of a data-to-language converter wherein a series of binary electrical signals are converted into a mechanical and/or electrical selection process whereby each code sequence for operating the teleprinter selects either one specific alpha-numeric character or a function such as "carriage-return," "Line-feed," "warning-bell," etc. Several basic teleprinter codes have been used, but one which is most widely employed is the ASCII (American Standard Code for Information Interchange). This is an eight-level binary serial code having 27 or 128 discrete code sequences. My invention is particularly adaptable for utilizing the conversion of such a code to a dictionary of multicharacter plain language words or symbolic letter groups. That is, it will convert from a binary or other data code forming the received input signal to ASCII in a form which is suitable for a teleprinter, so that a teleprinter will sequentially print out a series of characters in a predetermined word form in response to a single bit of data received by the apparatus.

In general, the present invention provides a system utilizing a printout device such as a teleprinter with a parallel to serial converter which will print characters sequentially in response to received input signals and in accordance with a predetermined decoding system such as the ASCII system. Mechanically coupled to the teleprinter is a time base device which is indexed by it once for each character that is printed and provides synchronizing input control signals to a data converter, thereby controlling the time position in which code signals are applied to the teleprinter. This latter function is accomplished in one form of my invention by a word section logic circuit in the converter section having a control gate which receives the data input pulse together with inputs from the time base device. The output from the control gate is connected in parallel to a series of character encoding gates, each having an output connected through a particular diode network to the printout device. Thus, by establishing the diode networks in a predetermined manner, the character encoding gates will produce a series of output pulses to the parallel to serial converter of the printout device which are decoded thereby to actuate the printout device.

It is, therefore, another object of my invention to provide a data readout system that will print out a predetermined word group or message in response to a single coded bit of received data input.

A further object of my invention is to provide a data readout system that is adaptable for use with a large variety of data transmission systems and which itself can utilize certain standard components of conventional teleprinter apparatus which can be easily modified in accordance with the invention.

Yet another object of my invention is to provide a data readout system wherein a mechanical time base device provides a positive synchronization for each character printed out so that all code signals to the teleprinter cannot be altered from a programmed sequence.

Another object of my invention is to provide a data readout system that is particularly well adapted for ease and economy of manufacture as well as one that is reliable and relatively easy to service and maintain.

Other objects, advantages and features of my invention will become apparent from the following detailed description presented in conjunction with the accompanying drawings, in which.

Figure 1:
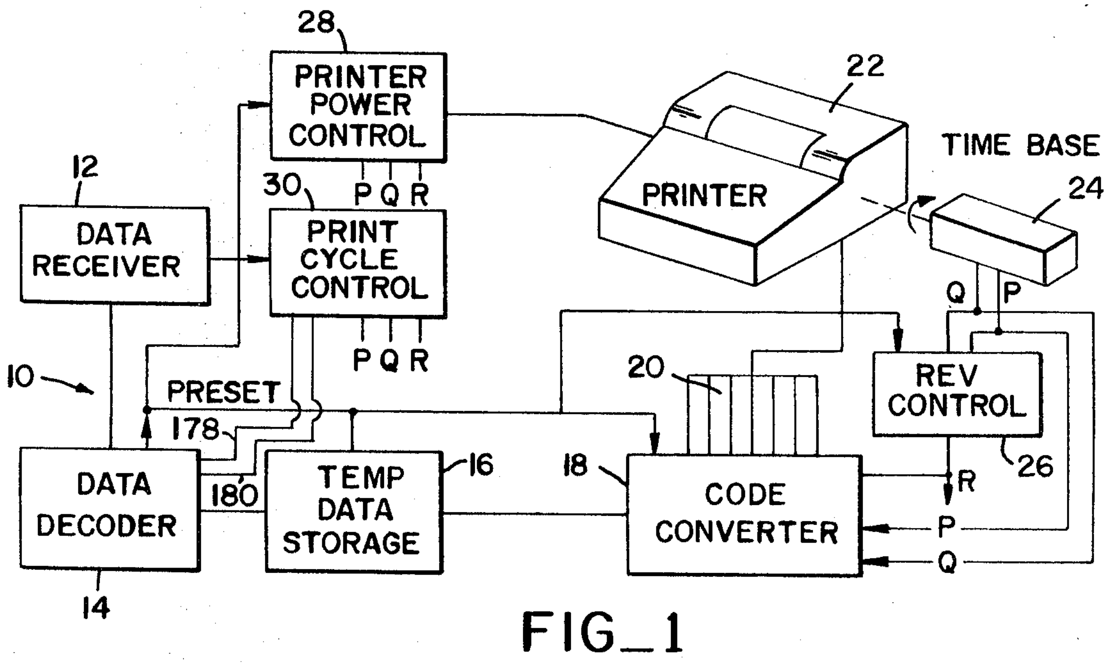
FIG. 1 is a block diagram showing the major components of my data readout system.

With reference to the drawing, FIG. 1 is a block diagram of a data readout system 10 according to my invention which will operate to print out a particular preselected word or group of words in response to data signal received from a remote station. Broadly, the system comprises a data receiver 12 which receives incoming data and sends it to a data decoder 14. The decoder, which may be of any suitable form capable of processing the data received to provide a characteristic data output pulse is connected through a temporary data storage circuit 16 to a code converter circuit 18. The latter has internal logic circuitry by which predetermined words or messages can be programmed and it supplies coded output signals through a series of code busses 20 to a modified motor-operated teleprinter unit 22. The code converter 18 also receives timing signals from a time base machine 24 which is mechanically connected to and driven by the teleprinter unit. Connected to certain outputs of the time base machine is a revolution counter 26 that multiplies the letter capacity of readout messages that can be printed by the system. The starting and stopping of the teleprinter is controlled by printer power and cycle control circuits designated by the blocks 28 and 30 respectively. From the initial data received, the data decoder produces a reset pulse which is applied through a lead buss 32 to the associated circuitry of the system to place it in the ready state, as will be explained below. When operative, the teleprinter will print out letters sequentially in response to whatever coded input signals are received from the code converter through the code busses. Since the time base machine 24 is indexed mechanically each time the teleprinter prints one letter, it provides a preselected synchronizing signal to the converter for the next letter. Thus, a predetermined series of converter output signals are produced as programmed through the code busses and the letters are printed sequentially by the teleprinter in precisely the predetermined order, all in response to one input data pulse.

Figure 2:
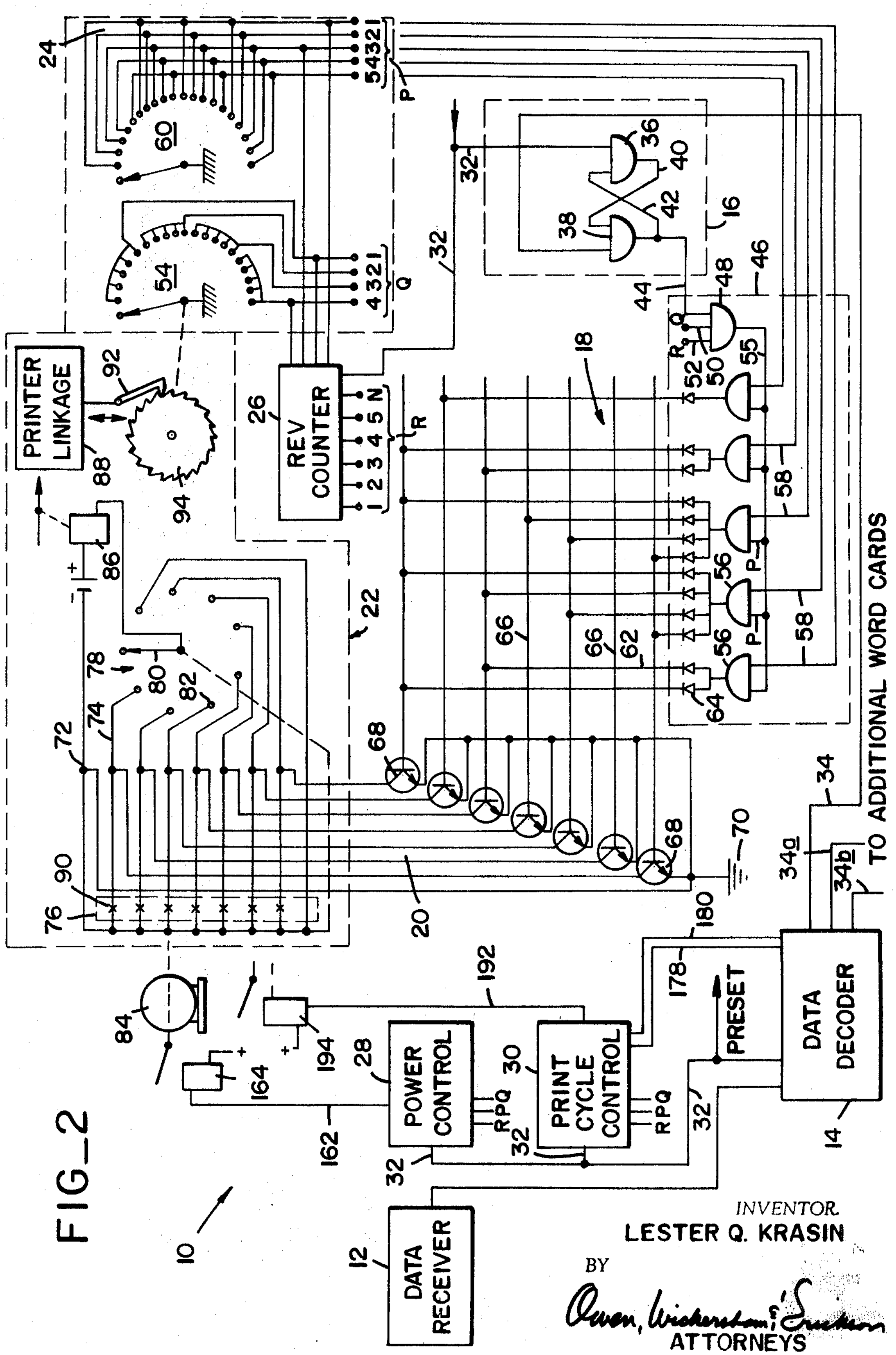
FIG. 2 is more detailed schematic diagram of the system shown in FIG. 1.

In FIG. 2, the data readout system 10 is shown in diagrammatic and partially in circuit form in greater detail. The data decoder 14 is again shown in block form since it may be any suitable decoding unit provided with appropriate internal circuitry well known in the art such as relay, diode or flip-flop matrices capable of processing incoming data signals and producing decoded output pulses.

For example in a typical application the data decoder could be a FOUR input NAND gate logic circuit (not shown) for decoding a four-element data input code. If and only if all four of the input leads are "0" voltage simultaneously, the output of this NAND gate will be a positive plus signal. Otherwise, the output is an "0" voltage. Alternatively, the data input signals could be two time and two tone code elements as used in existing time-tone data transmission systems, or they could be properly connected binary signals. Whatever the data input signal from the receiver, when all four inputs go to "0" simultaneously, there will be a plus pulse on the output lead of the gate, and its duration will be the period of the coincidence of the input data code.

The foregoing is only one example of a data decoder, and any circuit which puts out a plus pulse for a proper combination of data inputs will be compatible with the present system.

Similar decoding circuitry, well known in the art, is provided in the data decoder to produce a plus signal level preset pulse through the lead 32 to printer control circuits 28 and 30 for starting and controlling the cycle of the teleprinter. These circuit are shown as a block in FIG. 2, but will be described below in greater detail with reference to FIGS. 3 and 4.

As previously stated, the data output pulse from the data decoder is supplied through a lead 34 to the temporary data storage circuit 16. This latter circuit may be any suitable latching circuit or relay which serves to store the data signal from the data decoder until it is matched with an appropriate signal from the time base machine.

In the arrangement shown, the circuit 16 is a conventional RS flip-flop comprised of a pair of NAND gates 36 and 38 which are cross connected between respective input and output terminals by a pair of leads 40 and 42. The NAND gate 36 has one input connected to the lead 32 that supplies a plus signal level preset pulse, its other input being through the cross connected lead 42 from the output of the NAND gate 38. The output of the NAND gate 36 is supplied as one input to the NAND gate 38, the other input thereto being the data pulse supplied through the lead 34. The output of the temporary data storage circuit and thus the output from the NAND gate 38 is connected by a lead 44 to a word section circuit 46 which may be one of several such circuits in the code converter unit. For sake of simplicity only one word card is shown but it should be understood that several such word cards could be provided by being connected in parallel to the temporary storage circuit 16. Also, different groups of word cards or messages can be supplied by being connected to either of the leads 34, 34*a* and 34*b* etc. from the data decoder.

Each word section has a control gate 48 which may be a NAND gate that receives the a input from the temporary data storage and two timing inputs through leads 50 and 52 which are connected from a "quad" section terminal 54 of the time base machine and a terminal 56, the revolution counter. The output from the control gate through a lead 55 is connected in parallel to a series of letter code gates 56 which are two input NAND gates. Each of these letter gates is connected to one of five leads 58 that are connected to five terminals numbered 1, 2, 3, 4 and 5 at a position section 60 of the time base machine 24. Only five letter code gates are shown for each word card because this is the number that can be accommodated by the time base machine shown. However, as will become apparent the time base machine could be modified to provide a capacity for more or less letters within practical limits.

The output of each letter code gate is connected to one or more lead branches designated generally by the numeral 62, each having a diode 64. These diode branches are selectively connected through one or more of a series of seven leads 66, each of which is base connected to a switching transistor 68. The emitter of each transistor is connected to a common ground 70 and its collector is connected to one of the code busses 20. Each code buss terminates at a junction 72 of a lead 74 extending between a keyboard 76 and a parallel-to-serial converter 78 of a typical teleprinter device which can be used in my system if modified in accordance with the principles of my invention.

Since teleprinter apparatus per se is well known in the art, it will be described in this specification only to the degree necessary to describe the unique features of my invention. As schematically shown in FIG. 2, it is generally comprised of the keyboard 76 which, through the operation of a series of contacts by selected keys, will establish pulses that are coded in a predetermined manner and applied to the parallel-to-serial converter 78. This P-S converter comprises essentially a central motor arm 80 that scans a series of circumferentially spaced-apart contacts 82 on each revolution. The rotor area is mechanically connected to and thus is driven by a constant speed motor 84. As it rotates, the P-S converter transmits a binary serial stream to a selector magnet 86 whose serial operation will mechanically decode through an associated printer section 88 and, by means of a suitable linkage (not shown), to print a selected character. Normally, the selection of a letter on the teleprinter keyboard mechanically actuates the converter so that its rotor 80 scans all eight coding lead contacts 82 and returns to the stop position until the next key is depressed. In the present invention the keyboard is not required although it is shown to facilitate the explanation of my invention. However, between the normal keyboard contacts 90 and the stator contacts 82 on the P-S converter 78, the code buss lines 20 are connected to the key leads 74, as shown in FIG. 2. As a result, the teleprinter 22 now receives coded inputs direct from the code converter circuit 18 in the same manner as it previously received pulses by conventional key operation.

In accordance with my invention, as previously mentioned, the teleprinter mechanism is mechanically coupled to the time base machine 24 so that for every complete rotation of the parallel to serial converter 78 it will advance one position. In our apparatus this mechanical coupling is accomplished by use of a pawl 92 which is mechanically linked to the printout mechanism and engages a ratchet wheel 94 that is connected to a main shaft 96 for the rotary time base unit 24. Each actuation of the teleprinter causes the pawl to rotate the ratchet wheel and thereby index the time base machine one increment.

Figure 7:
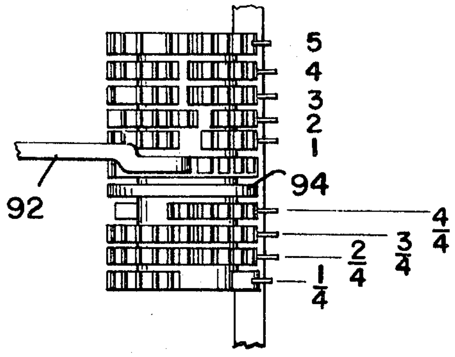
FIG. 7 is a top view of the time base drum.
Figure 6:
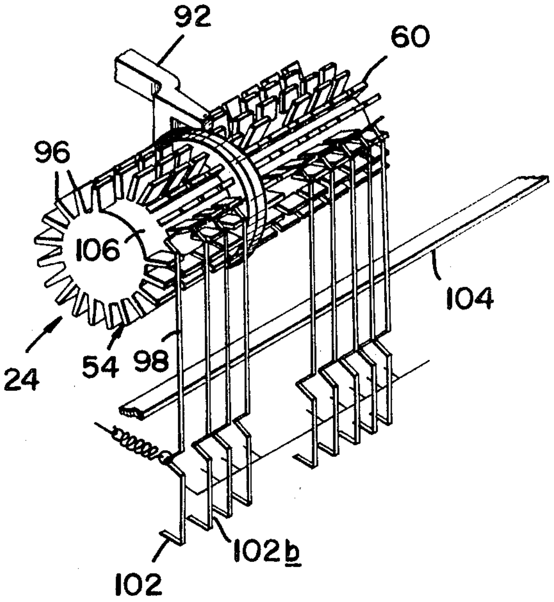
FIG. 6 is a view in perspective of the time base drum.
Figure 8:
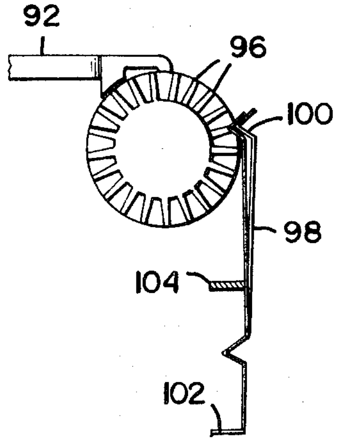
FIG. 8 is an end view in section of the time base drum taken along 8–8 of FIG. 7.

The time base machine is shown schematically in FIG. 2 as comprising a pair of mechanically connected step switches 54 and 60 that provide two different time related outputs and comprise the "quad" and "position" sections respectively. Actually, these step switches are preferably provided in the form of a cylindrical drum 24 which is shown in FIGS. 6 to 8. This drum may be similar to an answer-back drum of a conventional teletype apparatus which is generally made of a plastic material and is provided with axially spaced apart circular rows of circumferentially spaced-apart and radially extending cam members or lifts 96. The lifts of each circular row are originally spaced apart equally and they are aligned axially along the drum. However, these lifts are easily removable so that a different predetermined circumferential spacing between lifts can be obtained on some of the circular rows to provide a desired cam action on switches as the drum rotates. In my arrangement, the first four axially spaced-apart rows identified as 1/4, 2/4, 3/4 and 4/4 provide four timing increments forming the "quad" section 54. Similarly, the five rows of lifts at the other end of the drum provide the five "position" timing increments numbered 1, 2, 3, 4, 5 for each of the "quad" timing slots. When the drum is advanced one increment by action of the teleprinter in printing a letter, it rotates an amount equal to the normal distance between lifts. Aligned with each of the lift rows on the timing drum is a pivotal switch arm 98 which is spring biased to pull one end 100 against the drum. The other end of each switch arm is connected to a lead 102 which carries current from the time base drum. A contact bar 104 connected to an adjacent power supply (not shown) is mounted transverse to the series of switch arms 98 so that each switch arm will engage the contact bar and supply current through its contact wire when the drum is rotated to a position where the end 100 of a particular switch arm will not contact a lift. In each of the first four rows of lifts forming the "quad" section 54, five consecutive lifts are removed forming a space 106. In the second row from the end, the five open spaces formed by removed lifts form a space which starts at a position that is axially aligned with the next clockwise lift following the open space 106 of the first row. The five open lift spaces of the third and fourth rows are similarly indexed out of axial alignment relative to the preceding circular row. Thus, as the drum is turned step by step the first switch arm 98 of the "quad" section 54 is pulled against the contact bar 104 for five steps and then is cammed to an open position as the second switch arm for a lead 102*b* is pulled against the contact bar for the next five steps. The third and fourth switch arms are then closed for five consecutive steps in succession as the drum completes a full revolution.

In the rows of lifts in the position section 60 at the other end of the drum 24 four lifts are removed in each row at equally spaced-apart intervals. Each removed lift in the second row is located in the next axial line of lifts from the removed lift of the first row. The same is true for the other succeeding rows with respect to their adjacent preceding rows. Thus, as the drum turns, one of the "quad" switch arms 98 remains against the contact arm 104 for five steps, but during each step, the switch arms in the "position" section successively engage and disengage from the contact bar because they successively reach open spaces on the drum. One complete turn of the time base drum thus provides 20 different synchronizing time signals which may be applied to one or more word sections to control the printing out of a plurality of letters forming a word or message.

Figure 5:
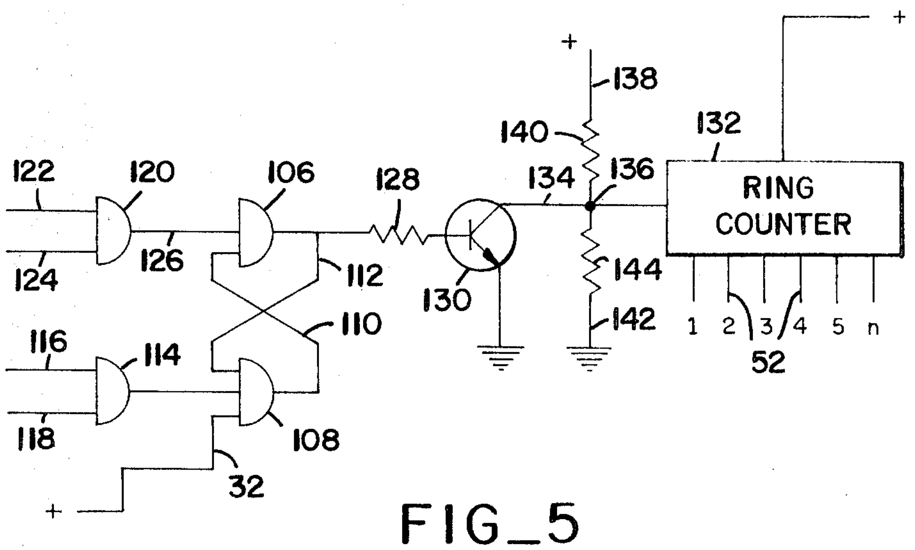
FIG. 5 is a diagram of the revolution counter circuit.

The revolution counter 26 provides a means for producing a separate group of identifying time signals for each revolution of the time base drum 24. As shown in the circuit diagram of FIG. 5, it comprises a pair of NAND gates 106 and 108 connected in an RS-flip-flop configuration by a pair of cross leads 110 and 112. A preset input from the preset buss 32 is connected to the NAND gate 108 which also receives an input from an auxiliary AND gate 114. A pair of inputs 116 and 118 to this AND gate, are connected from the No. 1 position switch and the "1/4" "quad" switch on the time base drum.

Another auxiliary AND gate 120 has inputs 122 and 124 connected to the No. 3 position switch, and the "4/4" "quad" switch on the time base drum, as indicated, and its output, through a lead 126 provides an input to the NAND gate 106. Its output is connected through a limiting resistor 128 to the base of a transistor 130 that forms part of pulse generator for a ring counter 132. The emitter of the transmitter is connected to ground, and its collector is connected through a lead 134 to the ring counter. The latter may be of the well-known type, comprised of J-K flip-flops and preferably having five or more outputs 52 which are numbered one through five, with the last one being designated *n* to indicate that any additional number of revolutions could be provided by adding stages to the ring counter. Between the transistor 130 and the ring counter in the lead 134 is a junction 136 of a lead 138 connected through a resistor 140 to a plus power source. Extending from this junction is another lead 142 connected through a resistor 144 to ground. The operation of this revolution may be described as follows:

Initially, a preset plus pulse is supplied to the NAND gate 108 and also to the ring counter 132. The ring counter is thus set to its starting position and produces a negative output on its "rev 1" output lead 52. The preset pulse to the gate 108 will set the RS-flip-flop and cause a plus voltage at the output lead from gate 106 and thus through the resistor 128 to the base of the transistor 130. This causes the transistor to be in a conducting state and produces an "0" level signal in the lead 134 to the ring counter, because the transistor in conducting causes current to flow from the power source to the emitter ground. When the time base drum is advanced to the 4/4 "quad" position and No. 3 in the "position" section, two simultaneous zero level voltages will appear on the input leads 122 and 124 to the gate 120, thereby causing it to put out a positive pulse. This positive pulse to gate 106 will reset the flip-flop such that the output of gate 106 becomes a zero level signal. This in turn will cause the transistor 130 to stop conducting and will put a plus voltage level out on the lead 134 into the ring counter. Since the ring counter is designed to step only in response to a negative pulse, nothing happens at this point. Now, when the time base drum is advanced to the first (1/4) "quad" position and No. 1 in the "position" section which would be at the beginning of the next revolution, two zero level voltages apparent on the leads 116 and 118 of the gate 114 will cause a positive pulse to appear on its output lead. This causes the flip-flop to reset again, putting a plus level out on the output of gate 106 through the resistor 128, thereby putting the transistor back into a conducting condition. The voltage in the lead 134 is thus caused to go negative and this signal causes the ring counter to step to the next revolution.

Figures 3, 4:
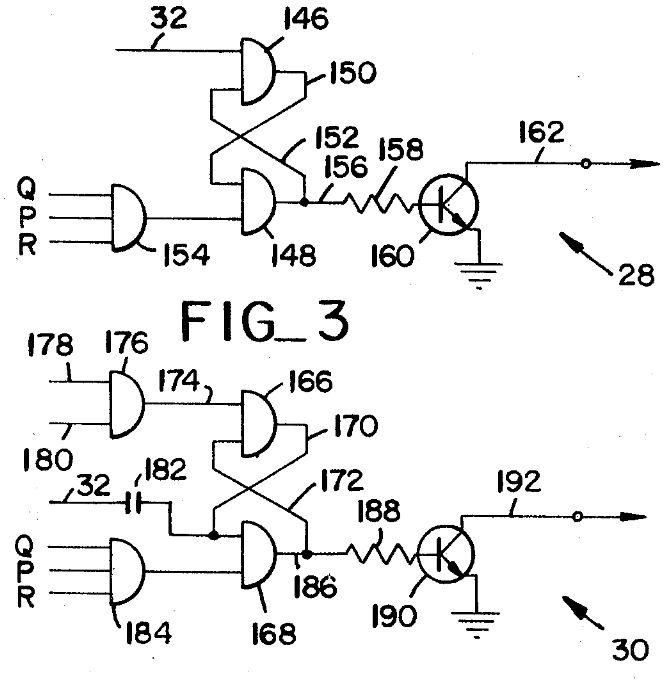
FIG. 3 is a more detailed diagram of the printer power control circuit.
FIG. 4 is a more detailed diagram of the printer cycle control circuit.

The printer power control circuit 28 operates to turn the equipment "on" and "off" in response to the receipt of incoming data. As shown in FIG. 3, it comprises a NAND gate 146 which is connected in an RS-flip-flop configuration with a NAND gate 148 by a pair of leads 150 and 152. The NAND gate 146 has an input from the preset buss 32 which supplies a preset pulse. The other NAND gate 148 receives an input from a three input AND gate 154 which has three input leads designated "Q," "P" and "R" connected from "quad" and "-position" sections of the time base machine and the revolution counter respectively. The output lead 156 of the NAND gate 148 is connected through a resistor 158 to the base of a transistor 160. The emitter of the transistor is connected to ground and its collector is connected through a lead 162 to a relay 164 or some other suitable control device that will turn on the teleprinter 22 (See FIG. 2). When a plus signal level preset pulse is provided on lead 32 to the NAND gate 146, the NAND gate 148 will produce a plus output signal through the resistor 158 to the transistor 160 causing it to conduct and operate the control device for turning on the teleprinter. A preprogrammed timing signal provided through each of the "Q," "P" and "R" inputs to the AND gate 154 will produce an output that causes the flip-flop to change state and remove the signal which had caused the transistor to conduct, thereby turning off the printer mechanism.

The printing cycle control circuit 30, as shown in FIG. 4, operates to initiate a printing cycle after the printing mechanism has been turned on and to turn off the teleprinter when a message has been printed out as programmed. This circuit also comprises a pair of NAND gates 166 and 168 connected in an RS-flip-flop configuration by a pair of cross connected leads 170 and 172. An input lead 174 to the NAND gate 166 is the output of a NAND gate 176 which receives data code inputs for the data decoder 14 through a pair of leads 178 and 180. The other NAND gate 168 of the RS-flip-flop circuit receives one input from the preset buss lead 32 through a capacitor 182. Another input lead to the NAND gate 168 comprises the output of a NAND gate 184 which is supplied with inputs through inputs "Q," "P" and "R" connected to the "quad" and "position" sections of the time base machine and the revolution counter respectively. A preprogrammed timing "0" level signal derived from these timing equipment elements on the leads "Q," "P" and "R" will cause a plus output signal from the gate 184 to the gate 168. Initially, a plus signal level preset pulse on the lead 32 through the capacitor 182 will set the RS-flip-flop connected NAND gates 166 and 168 so that an "0" level signal output will be apparent on the output lead 186 of the NAND gate 168. This output lead is connected through a limiting resistor 188 to the base of a transistor 190 having its emitter connected to ground and its collector connected by a lead 192 to a control device on the printer such as a solenoid 194. As shown in FIG. 2 the latter is mechanically coupled so that when tripped it will cause the teleprinter to print. When the output lead 186 carries an "0" level signal, it maintains the transistor 190 in a nonconductive condition. However, when a coincident "0" level data code input is applied to the NAND gate 176 through the leads 178 and 180 a plus signal level is produced in its output lead 174, and this causes the RS-flip-flop to change state, thereby placing the transistor 190 in a conductive state and placing a print-start signal on the lead 192 connected to the printer. Ultimately, the preprogrammed timing "0" level signal derived through the leads "Q," "P" and "R" from the time base machine and the revolution counter to NAND gate 184 will cause a plus signal on its output which will reverse the state of the RS-flip-flop thereby turning off the signal on the lead 192 to the print cycle control solenoid.

Each incoming data transmission to the data receiver 12 starts with data that can be decoded as a plus preset pulse by the data decoder 14. The preset pulse supplied to the power control circuit 28 will energize it and close the motor control relay 164, thereby starting the teleprinter motor 84. Simultaneously a plus preset pulse is furnished to all of the associated circuitry of the system to place it in the ready state condition to enable it to decode and print the appropriate message for the incoming data. Thus, the preset pulse is also supplied to the printer cycle control circuit 30, the revolution counter circuit 26 and the temporary storage circuit 16.

Now, the message data received by the data decoder 14 is decoded in such a form as to place a plus potential on its decoded output leads 34, 34*a*, 34*b* etc. In order that the decoded data remain latched in this condition until it has been translated and printed out, it is applied to the temporary data storage circuit 16. Here, the latching is accomplished by an RS-flip-flop, the decoded data being applied to its NAND gate 38. This flip-flop circuit was initially set to one state by the preset pulse to its other NAND gate 36 and is now switched to its other state by the plus pulse applied through the data lead. The flip-flop will now remain latched until such time as it again receives a preset pulse, which will not occur until the next data transmission. In this latched decoded data state, an "0" logic signal will be apparent on the output lead 44 of the temporary data storage circuit which is applied as one input to the three input AND gate 48 of the converter circuit 18.

As previously described, this latter gate serves as the control gate for the converter section and it receives outputs from preselected terminals of the "quad" switch and the revolution counter of the time base equipment which can be programmed to print a word in any position relative to other words in a message. The output of the control gate 48 is thus produced at a predetermined time and is connected in parallel to each of the code gates 56, in the converter section, the plus voltage outputs of these various gates being selectively applied through their different diode networks to the code busses 20. Each code gate also receives a particular input from the output of the "position" section of the time base drum when a specific "position" switch of drum is closed. Therefore, the particular letter which is produced by a code gate, and the location of the letter in a sequence can be programmed as desired.

The diodes 64 in the output network of each code gate 56 are connected in a selected manner to one or more of the base leads 66 to the transistors 68 so that a plus voltage at their anode side will cause only those transistors to conduct which are required to select a predetermined teleprinter character. Thus, as the time base machine is indexed for every letter printed, one of the code gates is activated to produce a plus output through its diode network and the appropriate transistors to the parallel to serial converter 78 of the teleprinter 22. The teleprinter then prints out the appropriate letter for the code signals received. This is accomplished by the motor driven rotor 80 of the teleprinter which scans around the eight circumferentially spaced-apart code sections 82 and returns to the stop position until the next data is received from the code busses. The rotor thus transmits a binary serial stream to the selector magnet 86, whose serial operation will mechanically code the associated printing section 88 to print a character selected by the particular code signals produced. As each letter is printed by the teleprinter, the mechanically link pawl 92 is moved linearly to index the ratchet wheel 94 and also move the shaft-connected time base drum 24 one increment. The time base drum, as described, will provide 20 discrete coded outputs for each different "quad" and "position" combination related to a serial sequence.

As described, relative to FIG. 4B, the revolution counter circuit 26 is activated as the last "quad" (Q) and third "position" (P) status of the drum is reached, and its ring counter 132 then steps the rev counter to the next revolution, thereby allowing the teleprinter 22 to continue printing out more words.

The printing cycle control 30 may be programmed, as previously described, to receive inputs from the time base equipment including the drum 24 and the revolution 26 counter at preselected time positions to shut off the circuit and the printing equipment at the end of a printed message.

Although for the sake of simplicity in describing my apparatus only one word section is shown in the code converter circuit 18, it should be apparent that additional word sections can be provided to provide the particular length of message desired. Each revolution of the drum provides for the printing of 20 characters or signals for the initiating other "events," and the revolution counter 26 can provide up to 5 revolutions or more, depending on the size of ring counter that is used.

Although the present invention may utilize various components from existing data reproduction systems, it combines such components in a modified form to provide a highly efficient and relatively simple data readout system. The mechanical connection between the printer and the time base machine provides for positive timing or serial sequencing of each character in a multicharacter message. Thus, coded data received from remote transmission stations can be monitored or recorded with ease and accuracy.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A data readout system comprising:
means for receiving and decoding data signals from a remote transmission source;
encoding means;
a printout means responsive to input impulses from said encoding means for printing characters;
time base means coupled to said printout means for providing a synchronized coded output for each sequential actuation of said printout means; and
converter means for combining the output from said time base means with the decoded data input signals for producing outputs for actuating said encoding means and thereby causing it to produce a programmed sequence of pulses for actuating said printout means.

2. A data readout system comprising:
means for receiving, decoding and temporarily storing data input signals from a remote transmission system;
a binary encoding means;
a printout means responsive to input impulses from said binary encoding means for printing characters in a serial sequence;
time base means mechanically coupled to said printout means for providing a synchronized coded output for each sequential actuation of said printout means; and
code converter circuit means for combining each coded output signal from said time base means with a decoded data input signal for producing outputs for accessing said binary encoding means and thereby causing it to produce a programmed sequence of pulses for actuating said printout means.

3. The readout system as described in claim 2 wherein said printout means includes a parallel to serial converter comprised of a stator having a series of circumferentially spaced-apart contacts, a rotary pickup arm within said stator for deriving signals from said contacts sequentially as it turns;
output leads from said converter circuit means connected to said contacts for supplying coded signals to said stator;
means for printing a predetermined character responsive to particular code signals transmitted to said rotor during one rotation around said stator;

and pawl means connected to said latter means for mechanically stepping said time base means one increment for each character printed.

4. The readout system as described in claim 2 wherein said printout means includes a parallel-to-serial converter and said converter circuit means comprises a control gate for receiving said binary encoding means including a data signal input and two time base inputs;

a plurality of character encoding gates, each connected in parallel to the output from said control gate, and each connected to a different output from said time base means;

a diode network containing one or more diodes connected to the output of each character encoding gate;

means connecting each diode network to said parallel-to-serial converter of said printout means;

and means in said printout means for printing a character in response to a preselected combination of impulses provided from the output of each character gate through its diode network.

5. The system as described in claim 2 wherein said time base means includes a drum having a plurality of circular rows of radially spaced apart lifts; switch means aligned with said lift rows; a contact bar supplied with electrical current; means urging each switch arm towards said contact bar; whereby the absence of one or more lifts in any given row causes the adjacent switch arm to engage said contact bar and produce an output signal.

6. The system as described in claim 5 wherein said time base means includes a revolution counter for producing a timing output signal on one of a plurality of output terminals related to one rotation of said drum, and stepping said output signal to another terminal every time said drum completes a revolution.

7. The system as described in claim 6 wherein said revolution counter comprises gate means responsive to input signals from said switch means on said drum for providing an output signal when said drum completes one revolution, and a ring counter responsive to the output of said gate means for stepping from one output terminal to another.

8. The system as described in claim 2 including a power control circuit means responsive to a preset signal for energizing said printout means and a printing cycle control circuit for cutting off said printout means at a predetermined time following the complete printing of a message.

9. A data readout system for printing a predetermined multiletter word or word groups in response to a single received data signal comprising, in combination:

a data receiver;

a data-decoding means connected to said data receiver for producing a data signal in the form of a plus level output;

means for receiving a data pulse from said decoding means and temporarily storing it until it is combined with a synchronizing signal;

a decoding data converter circuit including a control gate connected to the output of said storage unit;

a plurality of letter gates connected in parallel to the output of said control gate;

a distinctive code network connected from the output of each said letter gate to a code buss lead;

a teleprinter unit connected to said code buss leads from all said letter gates and including printer means for printing letters serially in response to coded input signals on said buss leads;

a time base machine mechanically connected to and stepped by said teleprinter unit for producing a series of synchronizing output signals serially during one cycle of operation, means for supplying a predetermined synchronizing signal to said control gate and to each said letter gate.

10. The system as described in claim 9 wherein said time base means includes a rotary drum having a first section with a first series of terminals, means providing an output on each of said first terminals for a predetermined portion of one revolution of said drum, and a second section with a second series of terminals, and means providing an output on each of said second terminals for an amount of angular rotation equal to said predetermined portion of one revolution divided by the number of said second terminals.

11. A data readout system adapted to printout a predetermined word group or message in response to a single coded bit of received data input comprising:

means for receiving data signals from a remote transmission source;

means for decoding a received signal;

a printout means having a parallel to serial converter;

time base means coupled to said printout means for supplying synchronizing control signals;

converter means including a word section logic circuit having a control gate which receives decoded signals and synchronizing control signals, and a series of character encoding gates each having an output; and a binary encoding means including a preselected network connected to each output of a said encoding gate, each said network providing a series of inputs for a word to said printout means.

12. The system of claim 11 wherein said converter means includes a plurality of word section logic circuits in the form of hard-wired printed circuit cards connected in parallel with said control gate each said card having character encoding gates that provide a preselected word group or message in response to certain single data inputs.